(12) United States Patent
Morse et al.

(10) Patent No.: US 6,238,315 B1
(45) Date of Patent: May 29, 2001

(54) HYDRAULIC COUPLING FOR VEHICLE DRIVETRAIN

(76) Inventors: David Marshall Morse, 3180 Coventry, Waterford, MI (US) 48329; Jun Yoshioka, 1021 Perry Woods Cove, Fort Wayne, IN (US) 46845

( * ) Notice: Subject to any disclaimer, the term of this patent is extended or adjusted under 35 U.S.C. 154(b) by 0 days.

(21) Appl. No.: 09/464,763

(22) Filed: Dec. 16, 1999

(51) Int. Cl.[7] ............................ F16H 48/30; F16D 23/10; F16K 15/00; F16K 15/16

(52) U.S. Cl. ................... 475/88; 192/103 F; 137/512.15; 137/856

(58) Field of Search ........................... 137/512.1, 512.15, 137/856, 857; 192/103 F, 35; 475/88

(56) References Cited

U.S. PATENT DOCUMENTS

| | | | |
|---|---|---|---|
| 3,265,085 | * 8/1966 | Koehler | 137/512.15 X |
| 4,719,998 | 1/1988 | Hiramatsu et al. . | |
| 5,390,700 | * 2/1995 | Fink et al. | 137/512.15 |
| 5,533,870 | * 7/1996 | Takenaka et al. | 137/512.1 X |
| 5,558,508 | * 9/1996 | Sasano et al. | 137/856 X |
| 5,647,395 | * 7/1997 | Hashimoto et al. | 137/856 X |
| 5,749,801 | * 5/1998 | Teraoka et al. | 475/88 |
| 5,887,622 | * 3/1999 | Ahn | 137/856 |
| 5,888,163 | 3/1999 | Shaffer et al. . | |
| 6,041,903 | * 3/2000 | Burns et al. | 475/88 X |
| 6,155,947 | * 12/2000 | Lowell | 475/88 |

FOREIGN PATENT DOCUMENTS

WO 93/19310 * 9/1993 (WO) ..................................... 475/88

* cited by examiner

*Primary Examiner*—Charles A. Marmor
*Assistant Examiner*—Roger Pang
(74) *Attorney, Agent, or Firm*—Liniak, Berenato Longacre & White

(57) ABSTRACT

A control valve of a hydraulic coupling controls pumping through a casing inlet port by a hydraulic pump and/or through a casing outlet port to control coupling between two rotary members such as by operation of a clutch. The casing is connected to one of the rotary members while a pumping component embodied by an impeller is connected to the other rotary member and meshed with an internal ring gear having one more tooth than the number of impeller teeth to provide sufficient pumping capacity so that the pump can act as a brake while still having relatively constant pumping pressure. The control valve includes a valve system through which pressurized hydraulic fluid selectively flows to control the coupling of the pair of rotary members. The instant invention provides a thin-plate check valve and pressure port stack which creates a hydraulic flow path for a gerotor pump and maintains pressure equalization about the gerotor pump. The thin-plate check valve and pressure port stack comprises a series of relatively thin circular plates assembled in a stacked arrangement, including a spring plate and a seal plate which interface to create a check valve assembly, a port plate which provides a pocket to equalize pressure in different areas of the gerotor pump and a limiter plate which prevents the spring arm from being damages by a vacuum and which prevents the spring arm from over-travel and deformation. The number and/or thickness of the port plates determine how far the spring arm can travel under pressure. The plates forming the stack of this invention are relatively large when compared to prior known check valve arrangements and, therefore, are easy to handle and assemble. The plates also provide pressure equalization about the gerotor pump while eliminating relatively expensive machining in the differential case required for conventional valve arrangements.

20 Claims, 6 Drawing Sheets

HYDRAULIC COUPLING FOR VEHICLE DRIVETRAIN

BACKGROUND OF THE INVENTION a) Field of the Invention

This invention relates to a hydraulic coupling for use with a vehicle drivetrain within a housing containing hydraulic fluid to rotatively couple a pair of rotary members about a rotational axis; for example, a speed sensitive limited slip differential.

b) Background of Related Art

Many types of hydraulic devices have utilized internal gear sets which are often called gerotors or rotors. Such devices can be used as pumps where shaft work is converted to hydraulic work and as motors where hydraulic work is converted to shaft work. In an internal gear pump or motor, an inner gear having outwardly directed teeth cooperates with an external gear having inwardly directed teeth so that fluid chambers therebetween increase and decrease in volume as the inner and outer gears rotate in a housing. By connecting the inlet and outlet of the device to the proper location along the sides of the gear set, the variable displacement chambers receive and discharge hydraulic fluid so that the device can function as a pump or motor. A shaft or other mechanical device can be connected to either the inner or outer gear depending upon the type of device.

Many of the internal gear pumps and motors of the prior art utilize a housing having a fixed inlet and outlet valve port. In other gerotor pumps and motors, a rotary valve plate or disc is used.

The gerotor pump has previously been utilized to couple rotary members of a vehicle drivetrain, particularly a limited slip differential mechanism. However, prior art gerotor pump devices suffer from inadequate or inefficient control valve systems. Conventional check valves and other control valve systems found in the prior art are difficult to handle and assemble and require expensive machining in the differential case.

The need therefore exists for an improved and efficient control valve system to replace the conventional check valve system while providing an effective hydraulic flow path.

SUMMARY OF THE INVENTION

The present invention provides an improved control valve for use in controlling rotative coupling of a pair of rotary members of a vehicle drivetrain.

In carrying out the above object, the control valve of this invention includes a valve system through which pressurized hydraulic fluid selectively flows to control the coupling of the pair of rotary members. The instant invention provides a thin-plate check valve and pressure port stack which creates a hydraulic flow path for a gerotor pump and maintains pressure equalization about the gerotor pump. The thin-plate check valve and pressure port stack comprises a series of relatively thin circular plates assembled in a stacked arrangement, including a spring plate and a seal plate which interface to create a check valve assembly. A port plate provides a pocket to equalize pressure in different areas of the gerotor pump, and a limiter plate prevents the spring arm from being damages by a vacuum and the limiter plate prevents the spring arm from over-travel and deformation. The number and/or thickness of the port plates determine how far the spring arm can travel under pressure.

The plates forming the stack of this invention are relatively large when compared to prior known check valve components and, therefore, are easy to handle and assemble. The plates also provide pressure equalization about the gerotor pump while eliminating relatively expensive machining in the differential case required for conventional valve arrangements.

The objects, features and advantages of the present invention are readily apparent from the following detailed description of the best modes for carrying out the invention when taken in connection with the accompanying drawings.

DETAILED DESCRIPTION OF PREFERRED EMBODIMENTS

Figure 1:
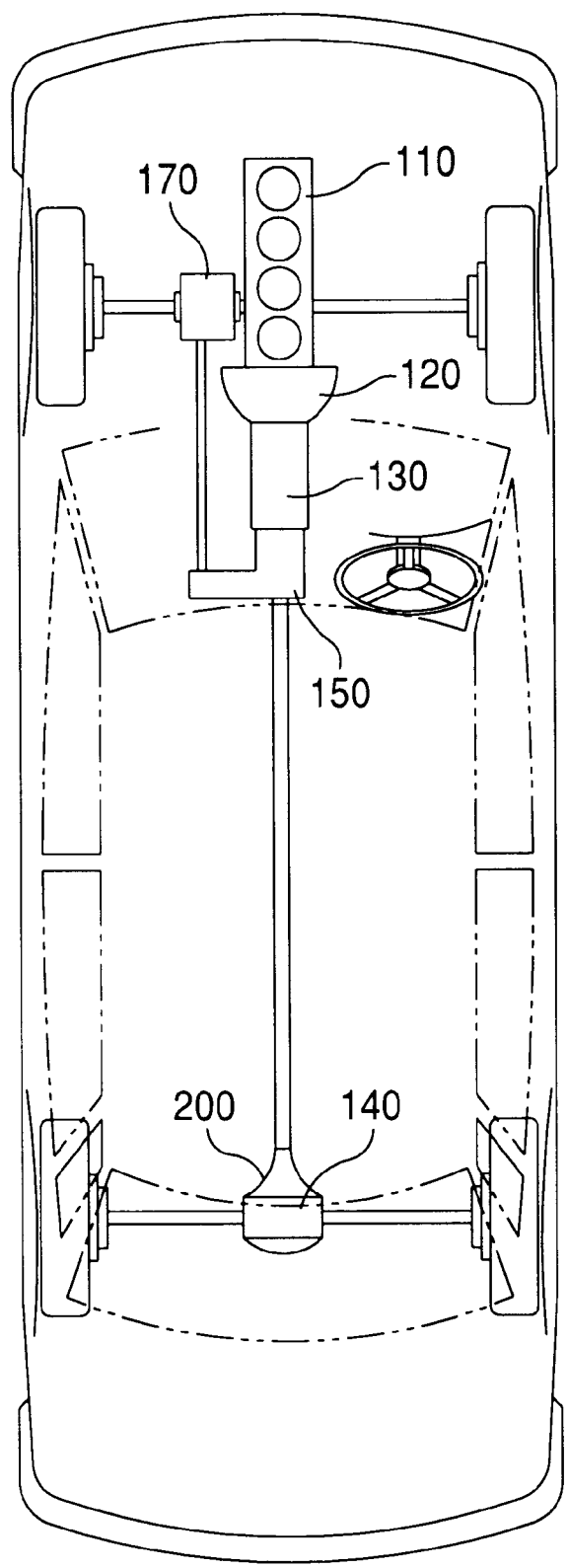
FIG. 1 is a schematic view of a four-wheel-drive vehicle incorporating the speed sensitive limited slip differential assembly of this invention.

With reference to FIG. 1, the four-wheel-drive vehicle provided in accordance with the present invention comprises an engine 110, a transmission 130 which is driven through a clutch 120 by the engine 110 to change the speed of the output rotation of the engine 110. A transfer case 150 divides torque transmission between a first differential 140 that drives a rear wheel systems and a second differential means 170 that drives the front wheel systems.

The first differential 140 is provided with a speed sensitive limited slip clutch system 200. As will be described in greater detail below, the speed sensitive limited slip clutch system 200 comprises an oil pump, i.e. gerotor pump, that is driven by the relative rotation between the vehicle's right and left axles to generate oil pressure corresponding to the speed of the relative rotation. A friction clutch mechanism progressively engages or locks up the differential gear set; i.e., the right and left axles with each other, based on the oil pressure generated by the gerotor pump. The speed sensitive limited slip coupling has such a property that the torque transmitted by the coupling is proportional to the speed of the relative rotation.

It must be understood that, while the present invention is described in relation to a speed sensitive limited slip differential, the present invention is equally suitable for use in a torque coupling mechanism, other hydraulic coupling for a drivetrain, or any other system requiring the inventive check valve system set forth herein.

Figure 2:
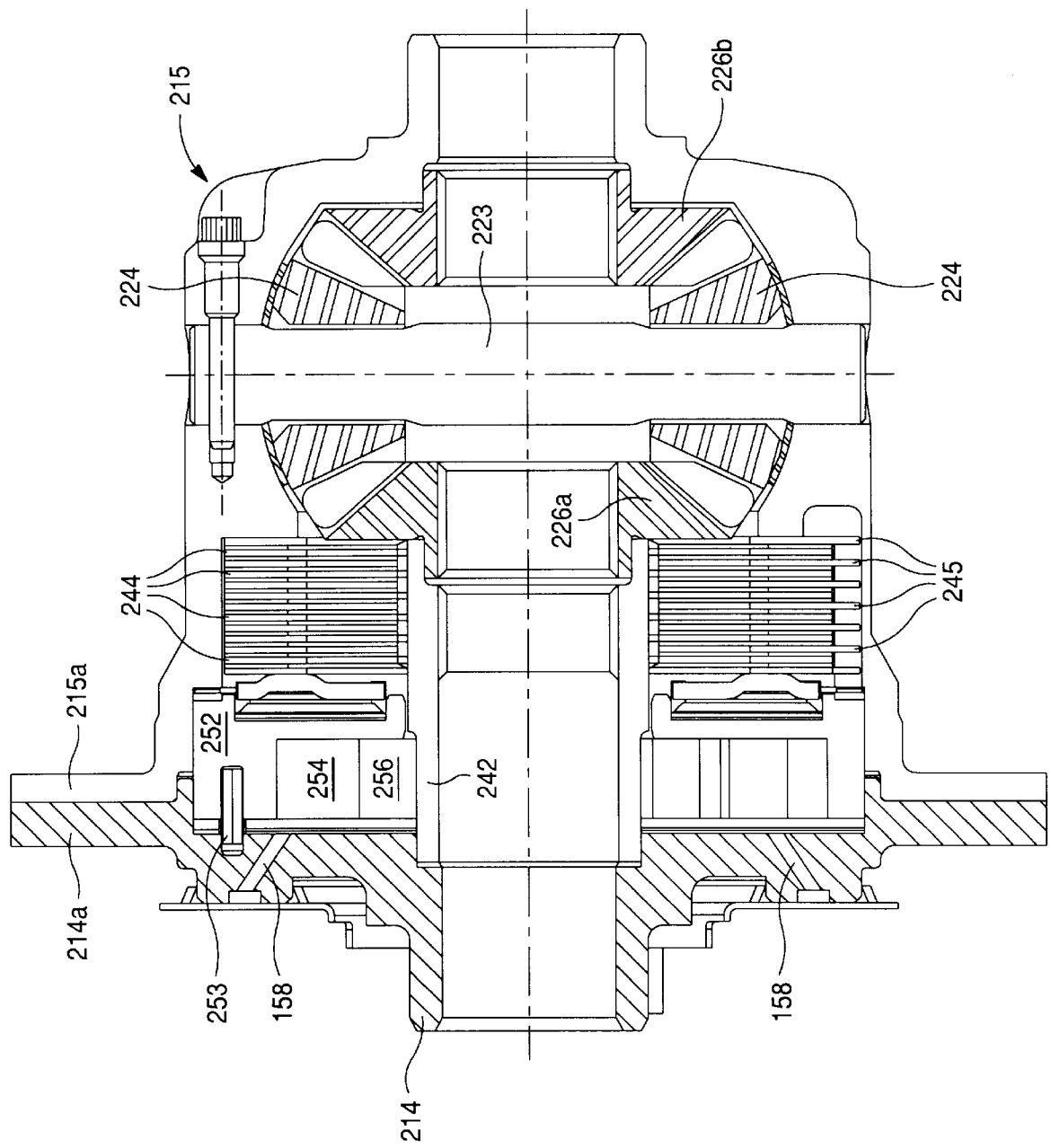
FIG. 2 is a sectional view of a differential assembly incorporating the thin plate check valve assembly of this invention.

FIG. 2 shows the components of the speed sensitive limited slip differential and gerotor pump assembly incorporating the thin plate check valve assembly of this invention. The ring gear (not shown) is bolted or other wise secured to the outer housing 215 at flanges 214a, 215a. The differential assembly shown in cross section includes the differential case 215, pinion gears 224, 224 and side gears 226a, 226b, wherein the pinion gears 224, 224 are mounted on the shaft 223.

Disposed adjacent the side gear 226a is an inner clutch sleeve 242 having external splines. A clutch pack is disposed between the right and left axles (axles shown in FIG. 1). Forming the clutch pack are clutch plates 244 and 245 alternately mounted between the inner clutch sleeve 242 and the differential case 215. The clutch plates 244 mate with the splines formed on the clutch sleeve 242, and the clutch plates 245 mates with splines or notches formed on the inner surface of the case 15. The clutch plates 244 frictionally engage the clutch plates 245 to form a torque coupling arrangement between the differential case and the planetary gearing assembly formed by the pinion gears 224 and side gears 226a, 226b. Torque is transferred from the ring gear to the differential case 215, which drives the pinion shaft 223 and the planetary gear set. As described below, a hydraulic pump actuates the clutch plates depending on the relative rotation between the differential case/ring gear and an impeller or inner rotor 256 of the. hydraulic pump.

A speed sensitive fluid pump arrangement 250 actuates a piston member that compresses the clutch pack to increase the frictional engagement between the clutch plates 244, 245. The speed sensitive fluid pump arrangement 250 comprises an outer ring member 252, an outer rotor 254 and an inner rotor 256. The inner rotor 256 mates with the clutch sleeve 242, and the outer ring member 252 mates with the differential case 215 via retention pin 253 (see FIG. 2).

Figure 3:
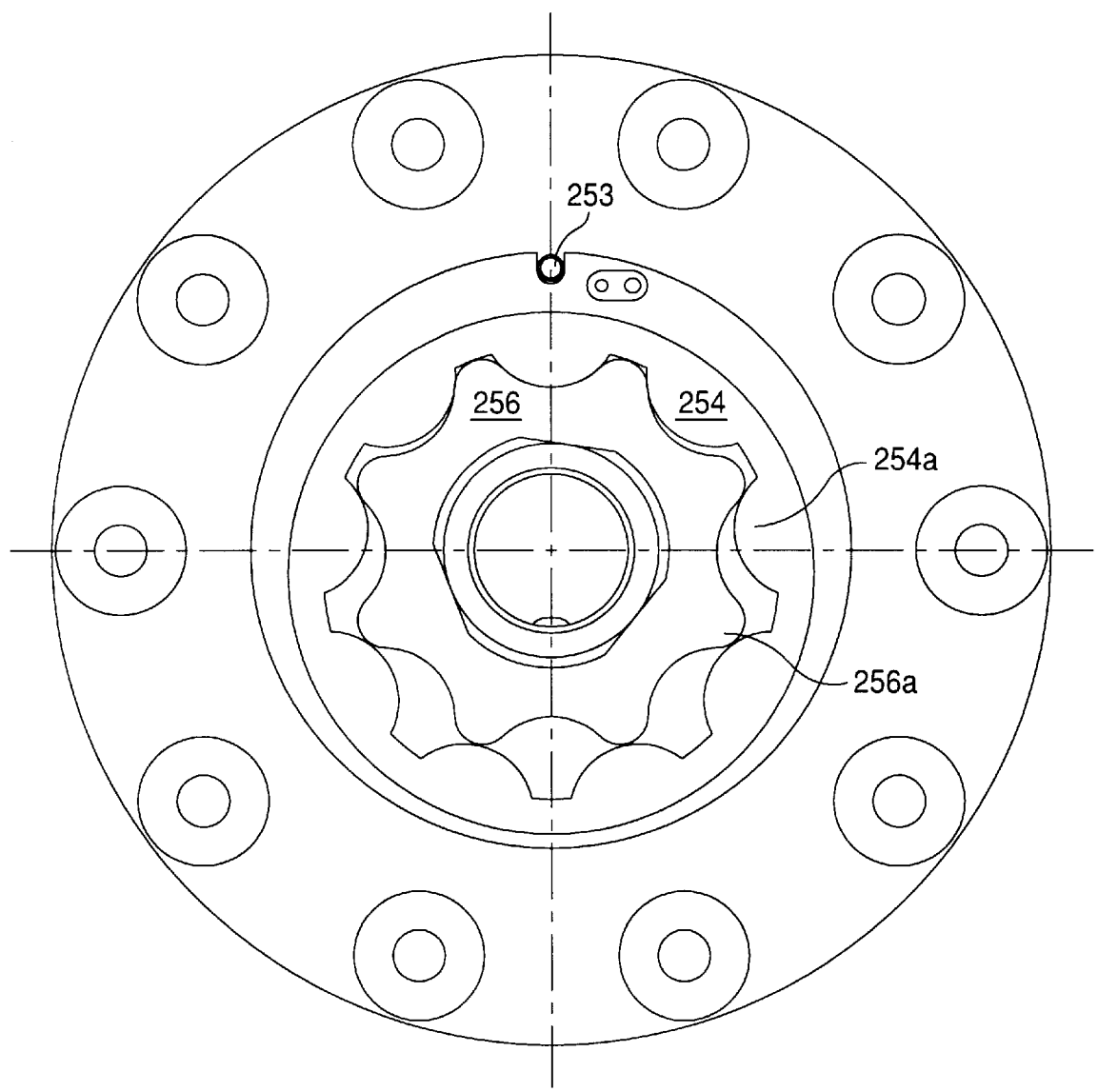
FIG. 3 is cross sectional view of the differential assembly showing components of the gerotor pump.
Figure 4:
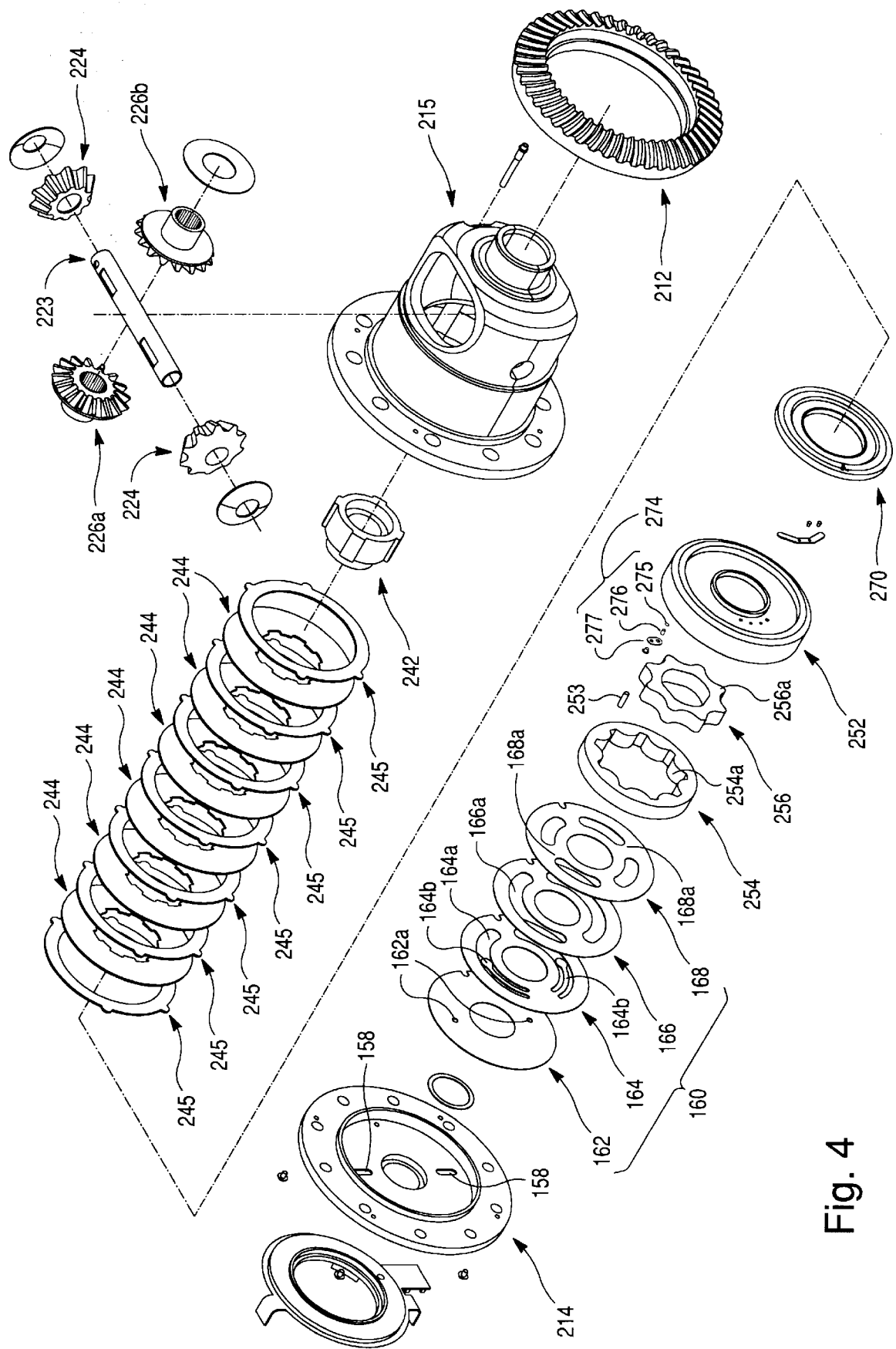
FIG. 4 is an exploded view of the primary components of one embodiment of the present invention.

As illustrated in FIGS. 3 and 4, the inner rotor 256 has one less tooth than the outer rotor 254 and when the inner rotor 256 is driven it will drive the outer rotor 254, which can freely rotate within the outer ring member 252 thus providing a series of decreasing and increasing volume fluid pockets by means of which fluid pressure is created. The structure and operation of the pump will be described in greater detail below.

External to the pump itself, the inner rotor 256 is matingly connected to the clutch sleeve 242, and the sleeve 242 meshes with clutch plates 244. When relative motion takes place between ring gear/differential case 215 and the inner rotor 256/clutch sleeve 242, the inner rotor 256 of pump 250 will create fluid pressure.

With combined reference to FIGS. 3 and 4, the hydraulic (gerotor) pump located within the casing 215 along the rotational axis A includes a pumping component embodied by an impeller 256 having external teeth 256a. The hydraulic pump also includes an internal ring gear 254 mounted on the casing 215 for rotation eccentrically with respect to the toothed impeller 256. The internal ring gear 254 includes internal teeth 254a of a number that is one more than the impeller teeth 256a and which are in a meshing relationship with the impeller teeth to provide a pumping action upon relative rotation between the casing and the toothed impeller. As is hereinafter more fully described, the impeller 256 most preferably has eight teeth 256a and the internal ring gear 254 has nine teeth 254a which is a relationship that provides sufficient pumping capacity so that the hydraulic pump can act effectively as a brake while still having relatively constant pumping pressure without fluid pulsation that would adversely affect the hydraulic coupling provided between the rotary members. It is also possible for the hydraulic pump to have its impeller provided with five or so (N) internal teeth and for the ring gear to have one more tooth (N+1) meshed with the impeller teeth which is a construction that will provide a somewhat greater pumping capacity but less consistency in the fluid pressure but not so inconsistent as to interfere with effective hydraulic coupling between the rotary members. Likewise, it is also possible for the hydraulic pump to have its impeller provided with seven internal teeth and its internal ring gear to have eight teeth when more consistent fluid pressure is desirable even though there is an accompanying decrease in the amount of pumped fluid.

As shown by FIG. 4, the casing cover 214 has inlets 158 through which hydraulic fluid is pumped into the casing by the hydraulic pump 250. There are actually two of the inlets 158 such that the pumping takes place in both directions of relative rotation between the rotary member embodied by the axle half shaft and the casing 215. In this connection, each of the inlets 158 includes an associated check valve for opening and closing the inlet bores. The check valves 160 comprise a series of stacked plates 162, 164, 166, 168. In fact, the instant invention provides a thin-plate check valve and pressure port stack which creates a hydraulic flow path for a gerotor pump and maintains pressure equalization about the gerotor pump. The thin-plate check valve and pressure port stack comprises a series of relatively thin circular plates assembled in a stacked arrangement, including a seal plate 162 having a pair of import apertures 162a aligned with the inlets 158. Adjacent the seal plate 162 is a spring plate 164 formed with a pair of arcuate grooves 164a and cantilevered spring-arms 164b. The seal plate 162 interfaces with the spring plate 164 to create a check valve assembly 160. A spacer or port plate 166 provides a pocket, which is formed by arcuate grooves 166a, to equalize pressure in different areas of the gerotor pump and a limiter plate 168 comprises limiter tabs 168a that limit deflection of the spring arms 164b. The limiter tabs 168a also prevent the spring arms 164b from being damaged by a vacuum and which prevents the spring arms 164b from over-travel and deformation. The number and/or thickness of the port plates 166 determine how far the spring arm 164b can travel under pressure.

Figure 5:
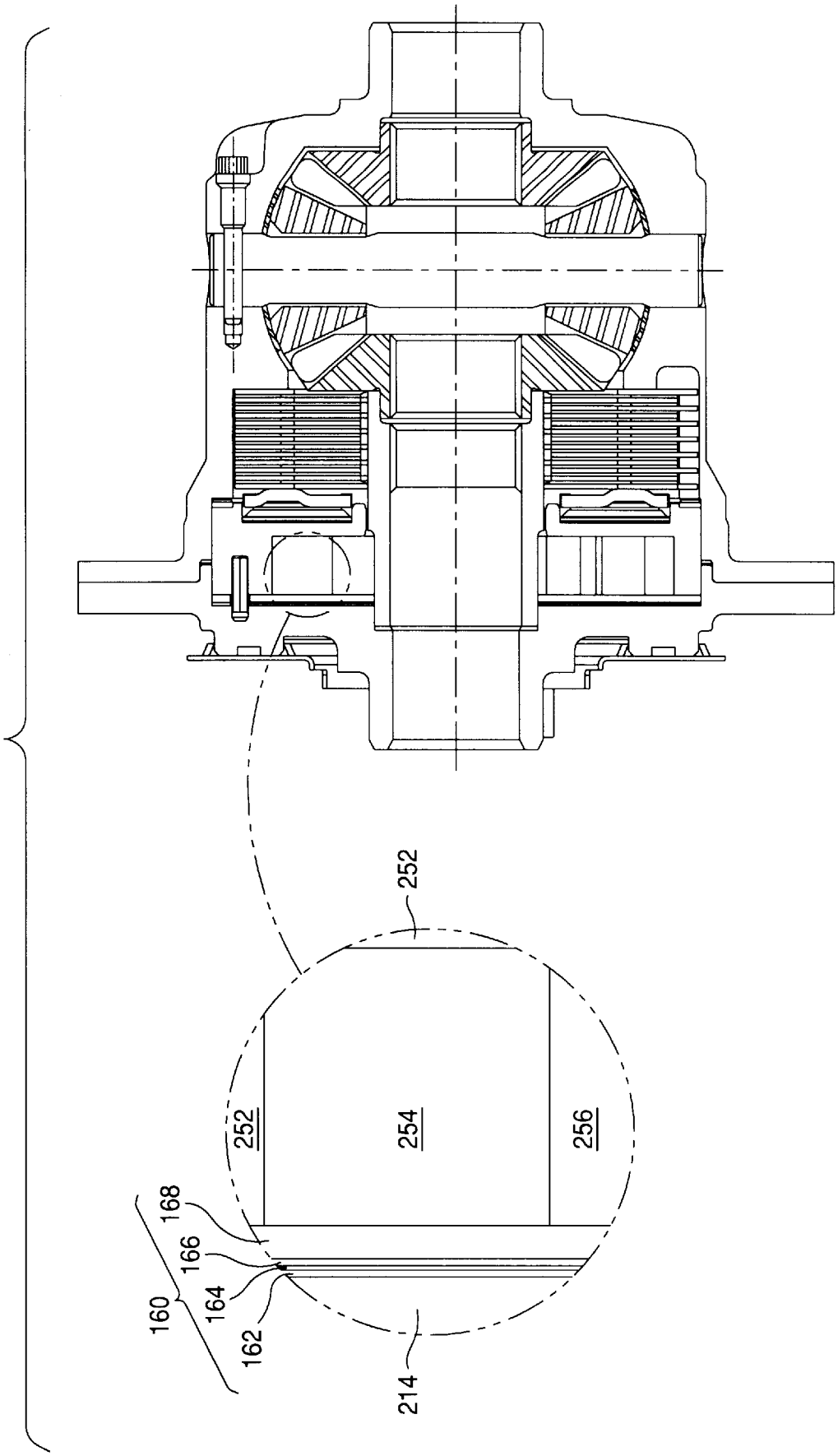
FIG. 5 is an enlarged view showing the dimensional relationship and positioning of the thin plate check valve assembly in relation to the hydraulic pump.

FIG. 5 is an enlarged view of the thin plate check valve assembly showing the dimensional relation and position of the check valve assembly in relation to the hydraulic pump. Upon one direction of relative rotation between the impeller 256 and the internal gear 254, one of the check valves 160 opens to permit the hydraulic fluid to be pumped through the ports 158 into the casing 215 while the other check valve 160 is then closed so that the hydraulic fluid is not pumped out of the casing through the other inlet port. During the opposite direction of relative rotation between the impeller 256 and the casing 215 the open and closed positions of the inlet ports 158 is reversed.

As previously mentioned, the clutch 260, which comprises clutch plates 244, 245, is disposed within the cup-shaped differential case 215 adjacent the junction thereof with the cap member 214 of the casing. The outer ring member 252 receives the hydraulic pump 250 and interfaces with the clutch 260. This outer ring member 252 has an annular piston chamber 252a that receives a clutch actuating piston 270 that engages the clutch 260 as is hereinafter more fully described to couple the ring gear 212 and differential case 222 with the right and left axles. Essentially, the clutch plate 244, 245 progressively lock both the right and left axles to the differential case 215 when their relative rotation exceeds a predetermined magnitude.

Outer ring member 252 also has a wall defining a pair of transfer ports 252b through which hydraulic fluid is pumped from the hydraulic pump 250 to the clutch actuating piston 270 within the piston chamber 252a. This flow through the transfer ports 252b is through one of the transfer ports upon one direction of relative rotation between the impeller 256 and the ring gear 212 and is through the other transfer port during the other direction of relative rotation between the impeller and the ring gear. Check valves formed by the plate 258 ensure that the hydraulic fluid pumped through either transfer port to the clutch actuating piston 270 is not pumped back into the hydraulic pump 250 through the other transfer port.

In order to prevent unwanted pressure build-up in the piston chamber 252a, a pressure limiting valve 274 is provided in the wall of the ring member 252 defining the transfer ports 252b. In the embodiment of the invention shown in FIG. 4, the pressure relief valve 274 is formed as a ball 275 and spring 276 which are held in place on the back side of the ring member 252 by a retention plate 277. While FIG. 4 shows one type of pressure relief valve 274, it will be understood by those of skill in the art that various equivalent valve may be use to accomplish the same function of relieving pressure build-up in the piston chamber 252a.

Essentially, the control valve of this invention includes a check valve system through which pressurized hydraulic fluid selectively flows to control the coupling of the pair of rotary members. The instant invention provides a thin-plate check valve and pressure port stack which creates a hydraulic flow path for a gerotor pump and maintains pressure equalization about the gerotor pump. While the present invention has been shown as a check valve delivery hydraulic fluid to a gerotor pump, it will be understood that the same check valve system may be disposed between the gerotor pump and the actuator piston acting on the clutch device in lieu of the one way valve 258 shown in FIG. 4. Moreover, the check valve arrangement is not limited to gerotor pump applications and it may effectively be utilized in other environments. In addition, the groove, spring arms and limiter tabs of the check valve system of the invention should not be limited in any way by the drawings which show the best mode of the invention currently known to the inventors.

Figure 6A:
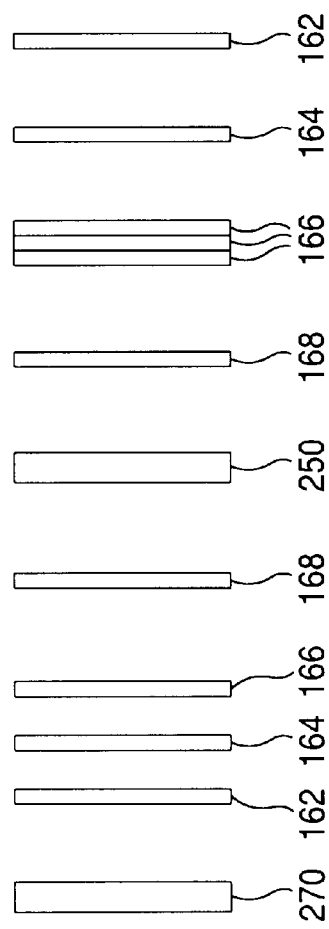
FIGS. 6a and 6b are schematics showing control valve systems for the gerotor pump.
Figure 6B:
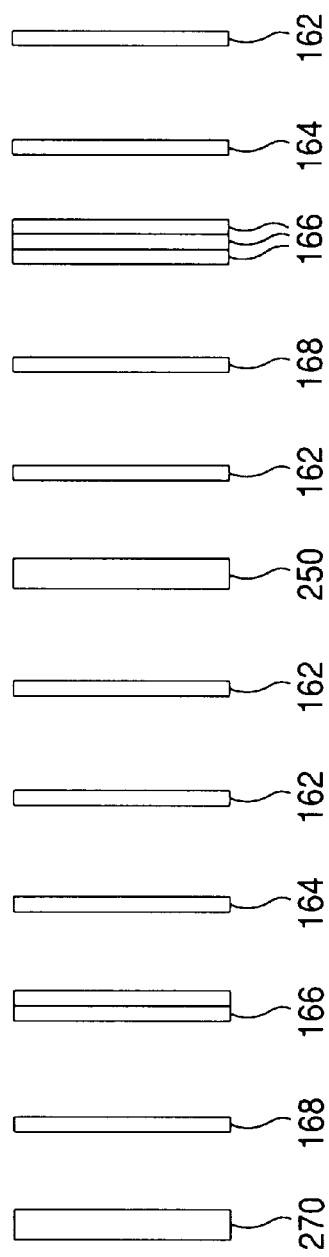

FIGS. 6a and 6b are schematic representations of alternate arrangements of the check valve assembly and gerotor pump system. The thin-plate check valve and pressure port stack comprises seal plates 162, spring plates 164, spacer or port plates 166 and limiter plates 168.

The thin-plate check valve and pressure port stack comprises a series of relatively thin circular plates assembled in a stacked arrangement, including a spring plate and a seal plate which interface to create a check valve assembly, a port plate which provides a pocket to equalize pressure in different areas of the gerotor pump and a limiter plate which prevents the spring arm from being damages by a vacuum and which prevents the spring arm from over-travel and deformation. The number and/or thickness of the port plates determine how far the spring arm can travel under pressure.

The plates forming the stack of this invention are relatively large when compared to prior known check valve arrangements and, therefore, are easy to handle and assemble. The plates also provide pressure equalization about the gerotor pump while eliminating relatively expensive machining in the differential case required for conventional valve arrangements.

The present invention has been shown and described with reference to specific embodiments forming the best mode, however various changes in form and detail may be made without departing from the spirit and scope of the invention. While the best modes for carrying out the invention have been described in detail, those familiar with the art to which this invention relates will recognize various alternatives, designs and embodiments for practicing the present invention as defined by the following claims.

What is claimed is:

1. A check valve system through which pressurized hydraulic fluid selectively flows, said check valve system comprising:
   at least one disk-shaped seal plate comprising at least one seal plate aperture passing therethrough;
   a disk-shaped spring plate comprising at least one spring plate aperture and a cantilevered spring arm disposed within said aperture, said spring plate being disposed adjacent to said seal plate;
   at least one disk-shaped port plate comprising at least one port plate aperture passing therethrough, said port plate being disposed adjacent to said spring plate such that said spring arm is aligned with said port plate aperture; and
   at least one limiter plate limiting movement of said spring arm,
   wherein said seal plate and said spring plate define a check valve, and said port plate and said limiter plate define operating parameters for said check valve.

2. The check valve system of claim 1, wherein at least one of said seal plate, said spring plate, said port plate and said limiter plate is circular in shape.

3. The check valve system of claim 1, wherein each of said seal plate, said spring plate, said port plate and said limiter plate are circular in shape.

4. The check valve system of claim 1, wherein said check valve system controls delivery of fluid driven by a gerotor pump.

5. The check valve system of claim 4, wherein said port plate aperture provides at least one pocket to equalize pressure in different areas of the gerotor pump.

6. The check valve system of claim 1, wherein said limiter plate prevents the spring arm from being damaged by a vacuum and prevents the spring arm from over-travel and deformation.

7. The check valve system of claim 1, wherein said port plate determines how far the spring arm can travel under pressure.

8. The check valve system of claim 4, wherein said check valve controls delivery of a hydraulic fluid to said gerotor pump.

9. The check valve system of claim 4, wherein said check valve controls delivery of said hydraulic fluid from said gerotor pump to an actuator piston driven by said gerotor pump.

10. The check valve system of claim 9, wherein said actuator piston controls a clutch disposed within a torque coupling device.

11. A hydraulic coupling for with a vehicle drivetrain within a housing thereof containing hydraulic fluid to rotatively couple a pair of rotary members about a rotational axis, the hydraulic coupling comprising:
    a casing of a hollow construction that is rotatable within the housing about the rotational axis;
    a hydraulic pump located within the casing along the rotational axis to provide a pumping action upon relative rotation between the two rotary members;
    an inlet port through which hydraulic fluid is pumped into the casing by the hydraulic pump;
    a clutch including a piston chamber located within the casing and having an actuating piston that is received within the piston chamber and driven to engage the clutch and couple the two rotary members to each other;
    the casing including a transfer port through which the pumped hydraulic fluid is fed from the hydraulic pump to the piston chamber;

an outlet port through which pumped hydraulic fluid flows from the piston chamber; and a control valve including, at least one seal plate comprising at least one seal plate aperture passing therethrough;

a spring plate comprising at least one spring plate aperture passing therethrough and a cantilevered spring arm extending into said aperture, said spring plate being disposed adjacent to said seal plate;

at least one port plate comprising at least one port plate aperture passing therethrough, said port plate being disposed adjacent to said spring plate such that said spring arm is aligned with said port-plate aperture; and at least one limiter plate limiting movement of said spring arm, wherein said seal plate and said spring plate define a check valve, and said port plate and said limiter plate define operating parameters for said check valve.

12. The hydraulic coupling of claim 11, wherein at least one of said seal plate, said spring plate, said port plate and said limiter plate is circular in shape.

13. The hydraulic coupling of claim 11, wherein each of said seal plate, said spring plate, said port plate and said limiter plate are circular in shape.

14. The hydraulic coupling of claim 11, wherein said check valve system controls delivery of hydraulic fluid driven by said pump, said pump being a gerotor pump.

15. The hydraulic coupling of claim 14, wherein said port plate aperture provides at least one pocket to equalize pressure in different areas of the gerotor pump.

16. The hydraulic coupling of claim 11, wherein said limiter plate prevents the spring arm from being damaged by a vacuum and prevents the spring arm from over-travel and deformation.

17. The hydraulic coupling of claim 11, wherein said port plates determine how far the spring arm can travel under pressure.

18. The hydraulic coupling of claim 14, wherein said check valve controls delivery of a hydraulic fluid to said gerotor pump.

19. The hydraulic coupling of claim 14, wherein said check valve controls delivery of said hydraulic fluid to said actuator piston driven by said gerotor pump.

20. The hydraulic coupling of claim 19, wherein said actuator piston controls a clutch disposed within a speed sensitive limited slip differential.

\* \* \* \* \*